United States Patent [19]

Kirsch et al.

[11] 4,218,645

[45] Aug. 19, 1980

[54] ASYNCHRONOUS MACHINES

[76] Inventors: Bernhard Kirsch, 23 Im Litzelholz, 5500 Trier-Biewer; Josef Wener, 15 Bergstrasse, 5559 Riol, both of Fed. Rep. of Germany

[21] Appl. No.: 842,887

[22] Filed: Oct. 17, 1977

[30] Foreign Application Priority Data

Oct. 15, 1976 [DE] Fed. Rep. of Germany ........ 2646550

[51] Int. Cl.² .............................................. H02P 9/46
[52] U.S. Cl. ....................................... 322/47; 310/168
[58] Field of Search ...................... 322/46, 44, 47, 28, 322/90; 310/168, 171

[56] References Cited

U.S. PATENT DOCUMENTS

| | | | |
|---|---|---|---|
| 3,017,562 | 1/1962 | Duane | 322/46 |
| 3,319,100 | 5/1967 | Erickson | 310/168 |
| 3,321,652 | 5/1967 | Opel | 310/168 |

FOREIGN PATENT DOCUMENTS 2353191  5/1975  Fed. Rep. of Germany ............ 322/90

OTHER PUBLICATIONS

"A Dictionary of Electronics", 2nd Ed., Handel, Penguin Books, 1968.

*Primary Examiner*—Robert J. Hickey
*Attorney, Agent, or Firm*—Robert W. Beach; Ward Brown

[57]  ABSTRACT

An asynchronous machine including a shaft, a rotor and a stator coaxial with the shaft is provided with a field coil having windings coaxial with and in a plane perpendicular to the machine shaft. The field coil is connectable to a variable DC source for controlling the magnetic flux in the machine. The output voltage of the machine can be controlled without changing the speed of rotation of the machine by controlling the current supplied to the field coil.

10 Claims, 6 Drawing Figures

ASYNCHRONOUS MACHINES

BACKGROUND OF THE INVENTION

1. Field of the Invention

The present invention relates to asynchronous machines having a rotor, a stator arranged coaxially with the shaft of the machine, and a winding, for connection to a DC source, by means of which the magnetic flux in the machine can be varied.

2. Prior Art

In asynchronous machines of the type mentioned above, the voltage can be altered by altering the speed of rotation of the machine. When however, the machine is used as an alternating current electrical generator it is particularly undesirable for the speed of rotation to change since a change in speed of rotation also involves a change in the frequency of the electrical output of the machine.

It is known to use electronic or electromechanical control arrangements to vary the voltage by way of the speed of rotation of a machine which drives the asynchronous machine. These control arrangements are complicated, however, and thus expensive, and the cost of manufacture of such a machine is therefore high. What is more, experience has shown that machines of this kind are less reliable. In hydraulic machines, for example, the regulation of the speed of rotation with known apparatus takes place too slowly.

SUMMARY OF THE INVENTION

The object of the present invention is to provide an asynchronous machine of the kind hereinbefore described whose output voltage can be adjusted in a simple fashion without altering the speed of rotation of the machine and thus without altering the frequency of the electrical output of the machine.

This object is achieved by providing a winding in the form of an annular field coil having windings arranged coaxially with the shaft of the machine in planes perpendicular to the shaft.

It is advantageous for the field coil to be arranged between two stator or rotor core segments of equal length. In another embodiment a field coil is arranged at each end face of the stator or rotor.

A circular ring of magnetic material is preferably coaxial with the field coil.

In a preferred embodiment the field coil, the stator and the rotor are surrounded by a housing of magnetic material and the bearing plates carrying the shaft of the machine are made of nonmagnetic material.

Advantageously, the field coil is connected to a variable DC source the output of which can be controlled according to electrical output of the machine.

In contrast to a synchronous machine in which a rotor always rotates at synchronous speed which is directly proportional to the frequency of applied or generated AC power, an asynchronous machine, also commonly referred to as an "induction machine", has a rotor which rotates at other than synchronous speed.

DETAILED DESCRIPTION OF PREFERRED EMBODIMENTS

Figure 1:
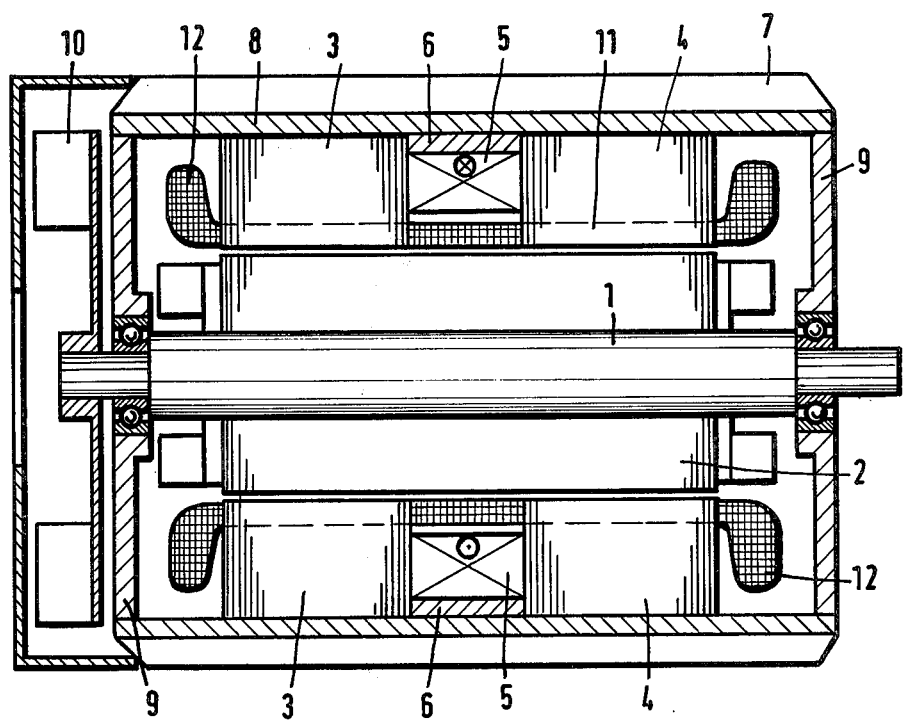
FIG. 1 is a longitudinal central section through an asynchronous machine according to the present invention.
Figure 2:
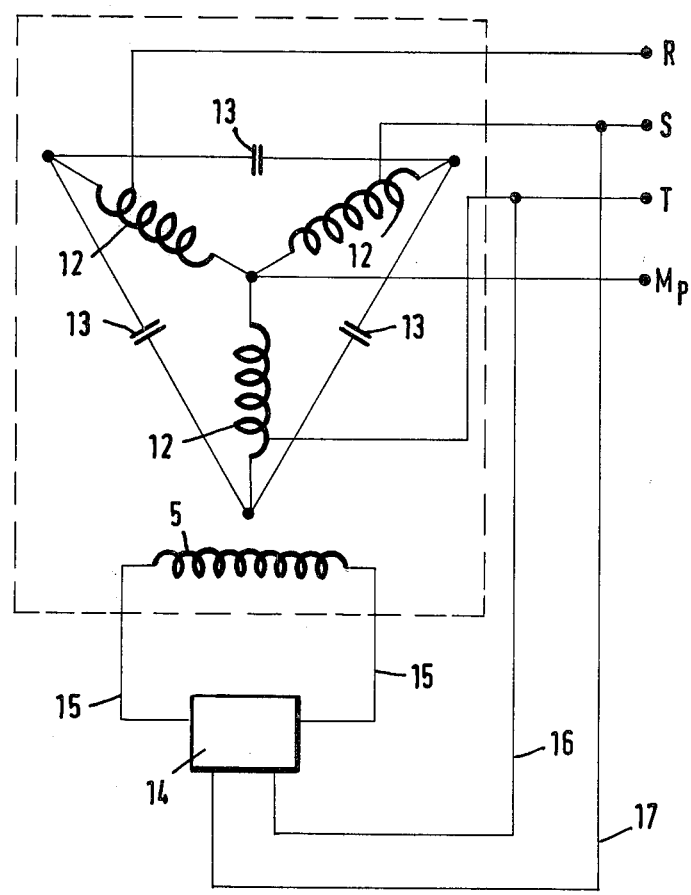
FIG. 2 is a diagrammatic circuit diagram of the asynchronous machine of FIG. 1.

In FIGS. 1 and 2, a self-excited asynchronous alternator has a short-circuited rotor 2 on a shaft 1. Around the rotor 2, two stator core segments 3 and 4 of equal length are arranged coaxially with the shaft 1 and between the stator core segments is mounted an annular field coil 5, also coaxial with the shaft 1. The windings of the field coil 5 are coaxial with the shaft 1 of the machine in planes perpendicular to such shaft. A circular ring 6 of magnetic material is arranged coaxially around the field coil 5 between the stator segments 3 and 4.

The machine has a housing 8 of nonmagnetic material which housing is provided with cooling vanes 7. At the housing ends are arranged bearing plates 9 supporting the ends of the shaft 1. A fan 10 is also arranged on the shaft 1 to cool the machine.

Polyphase windings 12 are inset in grooves 11 in the stator core segments 3 and 4. As diagrammatically illustrated in FIG. 2, the polyphase windings 12 are star-connected, with the common connection point connected to a terminal MP of the alternator. The windings 12 are tapped and the tapping points are connected to terminals R, S and T of the machine. Capacitors 13 are connected between the free ends of th windings 12. The variable DC source, which may include a transformer or a choke, supplies a larger or smaller DC current to the field coil 5 via lines 15. The field coil 5 generates a magnetic field which is closed through stator segment 3, ring 6, stator segment 4, shortcircuited rotor 2 and the shaft 1, with the result that the effective magnetic flux in the machine varies in accordance with the DC current which is supplied to the field coil 5 by the DC source 14. The change in the magnetic flux causes a change in the output voltage from the machine at terminals R, S and T. Thus, the output voltage from the machine can be varied simply by altering the current from the DC source flowing in the field coil 5. Preferably, a suitable feedback circuit including lines 16 and 17 connects the machine output to an input of the DC source so that the current supplied by such source is controlled by the voltage of the machine output.

It is advantageous for the dimensions of the annular field coil 5 to be such that its inner side adjacent to the short-circuited rotor 2 or the shaft 1 reaches approximately as far as the bottom of the grooves 11, so that the windings 12 can be inserted in a known fashion in the grooves 11 in the stator segments 3 and 4.

Instead of the circular ring 6 consisting of magnetic material, it is also possible for the housing 8 of the machine to consist of magnetic material so that the field generated by the field coil 5 is closed through stator segment 3, the housing 8 of the machine, stator segment 4, rotor 2, and the shaft 1 of the machine. To avoid a magnetic shunt, the bearing plates 9 are then made of nonmagnetic material.

Figure 3:
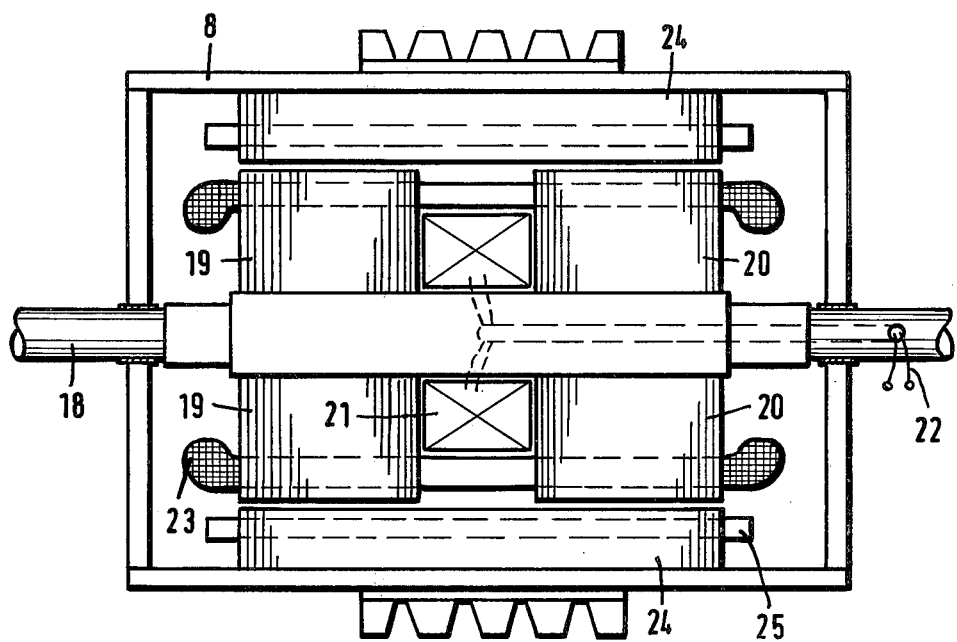
FIG. 3 is a longitudinal central section through a modified form of asynchronous machine in accordance with the present invention, such machine having an outside rotor.

In the case of the embodiment shown in FIG. 3, a stator includes two core segments 19 and 20 of equal length mounted in axially spaced relationship on a shaft 18. Between the stator segments is arranged a field coil 21 which is connected to a DC source such as 14 in FIG. 2 via lines 22. The stator 19, 20 has polyphase windings 23. Coaxial with the stator is a rotor 24 having bar windings 25, the rotor being rotatable about the shaft 18 to act as an outside rotor.

Figure 4:
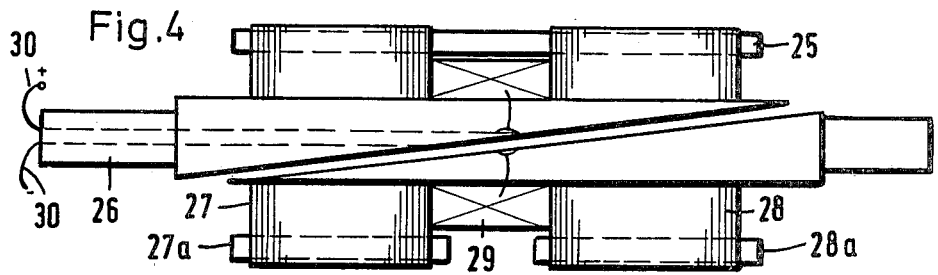
FIG. 4 is a longitudinal central section through another modified form of asynchronous machine in accordance with the present invention such machine having a field coil between the rotor core segments.

In the case of the embodiment shown in FIG. 4, a rotor mounted on a shaft 26 is divided into two segments 27, 28 between which is arranged a field coil 29 which is connected to a DC source via lines 30. In the case of this embodiment the stator has been omitted from the drawing. In the upper part of the figure the two segments of the rotor have a common bar winding 25, while in the lower part of the Figure each segment of the rotor has a bar winding 27a or 28a of its own.

Figure 5:
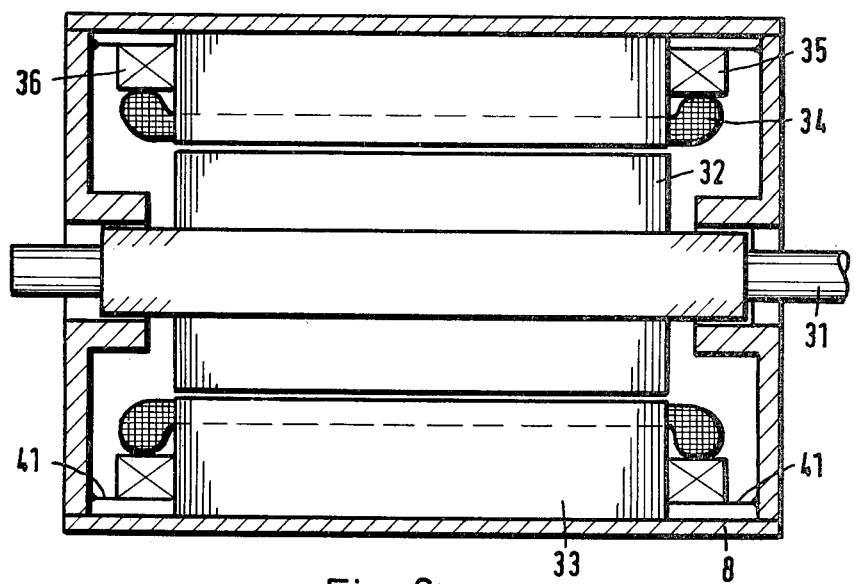
FIG. 5 is a longitudinal central section of still another modified form of asynchronous machine in accordance with the present invention, such machine having a field coil at each end face of the stator.

In FIG. 5 a rotor 32 is mounted on the shaft 31 of a machine. A stator 33 having polyphase windings 34 is arranged coaxially with the rotor. Field coils 35 and 36 are arranged at either end face of the stator 33.

Figure 6:
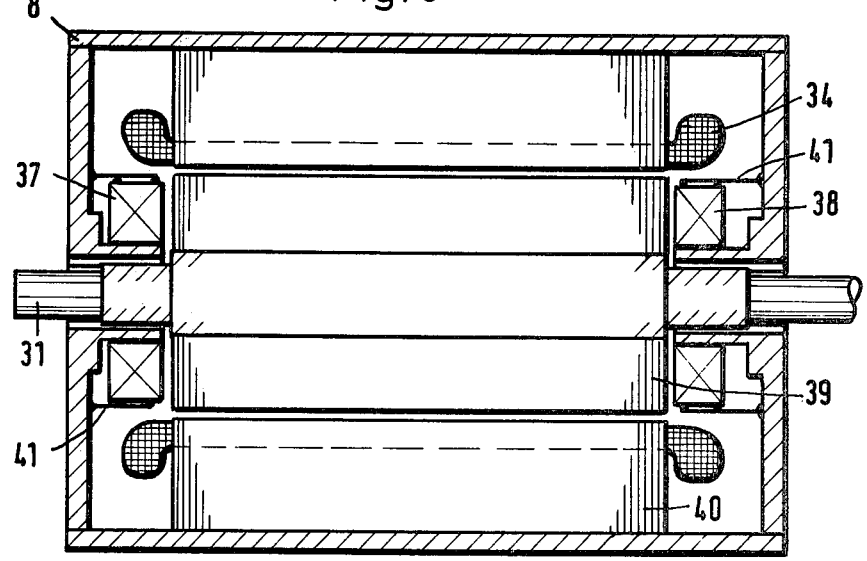
FIG. 6 is a longitudinal central section of yet another modified form asynchronous machine in accordance with the present invention, such machine having a field coil at each end face of the rotor.

In FIG. 6, field coils 37 and 38 are mounted near the end faces of a stator 39 which is surrounded coaxially by a rotor 40.

In the embodiments of FIGS. 5 and 6 a connection 41 provides a magnetic shunt, through which a magnetic current flows via the shaft 31, without compromising the support.

In FIGS. 1 to 5 the stator winding is shown as a polyphase winding. It is, however, also possible for the winding to be for single-phase AC.

We claim:

1. In an asynchronous machine including a rotor, a stator coaxial with the rotor and means for rotating the rotor relative to the stator at a speed other than synchronous speed, the improvement comprising coil means for varying the magnetic flux in the machine, said coil means including at least one annular coil having windings coaxial with the axis of rotation of the rotor and means for supplying direct current to said coil windings.

2. In the asynchronous machine defined in claim 1, the stator including two axially spaced stator core segments of equal lengths, and the annular coil being located between said stator core segments.

3. In the asynchronous machine defined in claim 1, the rotor including two axially spaced rotor segments of equal lengths, and the annular coil being located between said rotor segments.

4. In the asynchronous machine defined in claim 1, the coil means including two annular coils each having windings coaxial with the axis of rotation of the rotor, said two coils being located, respectively, at each end face of the stator.

5. In the asynchronous machine defined in claim 1, the coil means including two annular coils each having windings coaxial with the axis of rotation of the rotor, said two coils being located, respectively, at each end face of the rotor.

6. In the asynchronous machine defined in claim 1, a ring of magnetic material arranged coaxially around the annular coil.

7. In the asynchronous machine defined in claim 1, a shaft carrying the rotor, a housing of magnetic material surrounding the annular coil, the stator and the rotor, and bearing plates of nonmagnetic material carrying said shaft.

8. In the asynchronous machine defined in claim 1, such machine having means for producing an electrical output, means for receiving said electrical output and for varying the magnitude of the current supplied to the annular coil by the direct-current supplying means in response to variation in the magnitude of said electrical output.

9. In the asynchronous machine defined in claim 1, the annular coil being stationary relative to the stator.

10. In an asynchronous machine including a rotor, a stator coaxial with the rotor and having alternating current windings and means for rotating the rotor relative to the stator at a speed other than synchronous speed, the improvement comprising a field coil connectable to a direct-current source for varying the magnitude of the magnetic flux in the machine.

* * * * *